US011761530B2

United States Patent
Imai (10) Patent No.: US 11,761,530 B2
(45) Date of Patent: Sep. 19, 2023

(54) BREATHER STRUCTURE FOR ACTUATOR

(71) Applicant: DENSO CORPORATION, Kariya (JP)

(72) Inventor: Tsuyoshi Imai, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/944,558

(22) Filed: Sep. 14, 2022

(65) Prior Publication Data

US 2023/0003292 A1 Jan. 5, 2023

Related U.S. Application Data

(63) Continuation of application No. PCT/JP2021/010353, filed on Mar. 15, 2021.

(30) Foreign Application Priority Data

Mar. 19, 2020 (JP) .................................. 2020-049205

(51) Int. Cl.
| | | |
|---|---|---|
| *F16H 57/02* | (2012.01) | |
| *H02K 5/10* | (2006.01) | |
| *H02K 7/10* | (2006.01) | |
| *F16H 57/027* | (2012.01) | |
| *H02K 7/116* | (2006.01) | |

(52) U.S. Cl.
CPC ............. *F16H 57/027* (2013.01); *H02K 5/10* (2013.01); *H02K 7/116* (2013.01); *H02K 2205/09* (2013.01)

(58) Field of Classification Search
CPC ........ F16H 57/027; H02K 5/10; H02K 7/116; H02K 2205/09
See application file for complete search history.

(56) References Cited

U.S. PATENT DOCUMENTS

| | | | | | |
|---|---|---|---|---|---|
| 5,215,312 | A | * | 6/1993 | Knappe | ................. E05F 15/697 215/261 |
| 6,092,812 | A | * | 7/2000 | Ursel | .................. H05K 5/0213 277/630 |
| 6,827,232 | B1 | * | 12/2004 | Hara | ................. B29C 45/14811 220/780 |
| 8,727,844 | B2 | * | 5/2014 | Furuyama | ............. B29C 66/348 454/284 |
| 8,869,817 | B2 | * | 10/2014 | Sowul | ..................... F16K 33/00 137/244 |

(Continued)

FOREIGN PATENT DOCUMENTS

| | | | | |
|---|---|---|---|---|
| DE | | 3716912 A1 | * 12/1988 | |
| DE | | 20119461 U1 | * 4/2003 | ........... F16H 57/027 |

(Continued)

*Primary Examiner* — Adam D Rogers (74) *Attorney, Agent, or Firm* — Nixon & Vanderhye P.C.

(57) ABSTRACT

A breather structure of an actuator includes: a breathing hole that extends through a rear housing between an inside and an outside of the rear housing; a filter that is configured to permit a flow of gas through the breathing hole via the filter while limiting a flow of liquid and a flow of solid through the breathing hole between the inside and the outside of the housing; and a blocker. The blocker is configured to block a portion of a path extending from an outer opening, which is an opening of the breathing hole opened to an outside space, to the filter to limit arrival of the liquid and the solid from the outside space to the filter.

5 Claims, 11 Drawing Sheets

(56) References Cited

U.S. PATENT DOCUMENTS

| | | | |
|---|---|---|---|
| 10,562,579 B2* | 2/2020 | Wotton | B60K 37/02 |
| 2009/0189468 A1 | 7/2009 | Kume et al. | |
| 2018/0283524 A1 | 10/2018 | Uematsu et al. | |
| 2019/0207473 A1 | 7/2019 | Kato et al. | |
| 2019/0219246 A1 | 7/2019 | Yano | |
| 2023/0015043 A1* | 1/2023 | Tabuchi | H02K 5/1732 |

FOREIGN PATENT DOCUMENTS

| | | | | |
|---|---|---|---|---|
| JP | 2014-110691 | | 6/2014 | |
| JP | 2018037239 A | * | 3/2018 | F21S 45/10 |
| JP | 2021151105 A | * | 9/2021 | |

* cited by examiner

FIG. 15

BREATHER STRUCTURE FOR ACTUATOR

CROSS REFERENCE TO RELATED APPLICATIONS

This application is a continuation application of International Patent Application No. PCT/JP2021/010353 filed on Mar. 15, 2021, which designated the U.S. and claims the benefit of priority from Japanese Patent Application No. 2020-049205 filed on Mar. 19, 2020. The entire disclosures of all of the above applications are incorporated herein by reference.

TECHNICAL FIELD

The present disclosure relates to a breather structure for an actuator.

BACKGROUND

Previously, there has been proposed a waterproof actuator that has a breather for adjusting a pressure. In one such an actuator, a housing has a breathing passage, and a filter unit is installed at an outer side of the breathing passage. The filter unit includes a holding member, a filter and a cap. The holding member is shaped in a tubular form and is press-fitted to an outer wall of the housing. The filter is in a form of a film and is installed at an end portion of the holding member. The cap is shaped in a bottomed tubular form and is installed at an outer side of the holding member such that the cap covers the filter.

SUMMARY

This section provides a general summary of the disclosure, and is not a comprehensive disclosure of its full scope or all of its features.

According to the present disclosure, there is provided a breather structure. The breather structure includes a breathing hole, a filter and a blocker. The filter is configured to permit a flow of gas through the breathing hole via the filter while limiting a flow of liquid and a flow of solid through the breathing hole. The blocker is configured to block a portion of a path extending from an outer opening, which is an opening of the breathing hole opened to an outside space, to the filter to limit arrival of the liquid and the solid from the outside space to the filter.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Previously, there has been proposed a waterproof actuator that has a breather for adjusting a pressure. In one such an actuator, a housing has a breathing passage, and a filter unit is installed at an outer side of the breathing passage. The filter unit includes a holding member, a filter and a cap. The holding member is shaped in a tubular form and is press-fitted to an outer wall of the housing. The filter is in a form of a film and is installed at an end portion of the holding member. The cap is shaped in a bottomed tubular form and is installed at an outer side of the holding member such that the cap covers the filter.

As in the actuator described above where the filter unit is installed such that the filter unit projects at the outside of the housing, and a protective wall is formed at the housing to protect the filter unit from high-pressure liquid, in order to ensure a clearance relative to a component of the installation destination device, to which the actuator is installed, it may be necessary to form a recess at a corresponding location of the component of the installation destination device, or it may be necessary to place the actuator spaced from the component of the installation destination device. Therefore, the installability of the actuator may be deteriorated. In view of this, it is conceivable to directly install the filter to the housing to avoid the projection of the filter unit at the outside of the housing. However, in such a case, when the high-pressure liquid is directly applied to the filter, the filter may possibly be removed from the housing or may possibly be damaged.

According to the present disclosure, there is provided a breather structure configured to be provided to a housing of an actuator. The breather structure includes a breathing hole, a filter and a blocker. The breathing hole extends through the housing between an inside and an outside of the housing. The filter is configured to permit a flow of gas through the breathing hole via the filter while limiting a flow of liquid and a flow of solid through the breathing hole between the inside and the outside of the housing. The blocker is configured to block a portion of a path extending from an outer opening, which is an opening of the breathing hole opened to an outside space, to the filter to limit arrival of the liquid and the solid from the outside space to the filter.

According to the present disclosure, the filter is placed on the side of the outer opening of the breathing hole where the inside of the housing is located, so that the projection of the filter to the outside of the housing can be avoided. Therefore, the installability of the actuator is improved. Furthermore, when the high-pressure liquid tries to flow into the breathing hole, the blocker weakens the pressure of the liquid, so that the filter can be protected.

Hereinafter, a plurality of embodiments of an actuator will be described with reference to the drawings. The same reference signs are given to substantially the same portions among the embodiments, and the redundant description thereof will be omitted for the sake of simplicity.

First Embodiment

Figure 1:
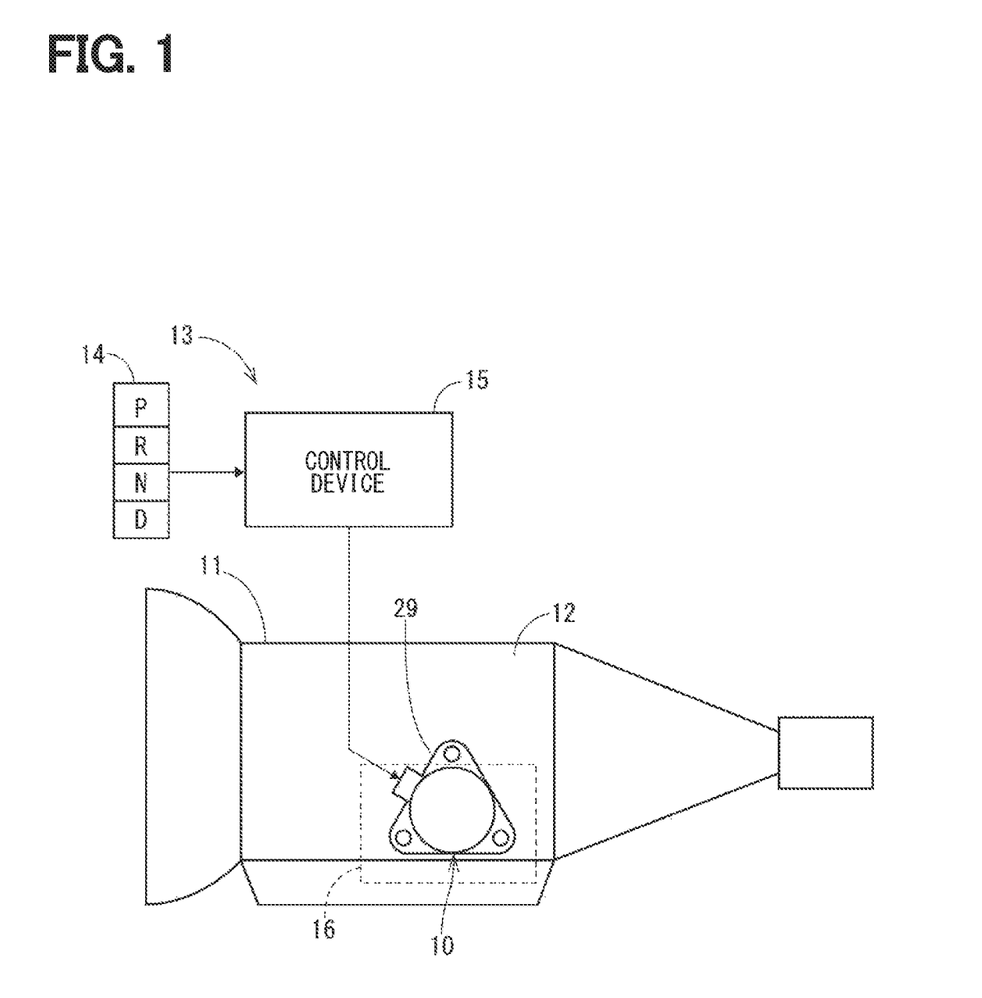
FIG. 1 is a schematic diagram illustrating a shift-by-wire system to which an actuator of a first embodiment is applied.

As shown in FIG. 1, an actuator 10 of a first embodiment is fixed to an outer wall of a case 12 of a vehicle transmission 11 and is used as a drive device of a shift-by-wire system 13. The actuator 10 is controlled and is driven by a control device 15 based on a command signal outputted from a shift operation device 14 to change a shift range by driving a shift range change mechanism 16 of the transmission 11.

(Actuator)

Figure 2:
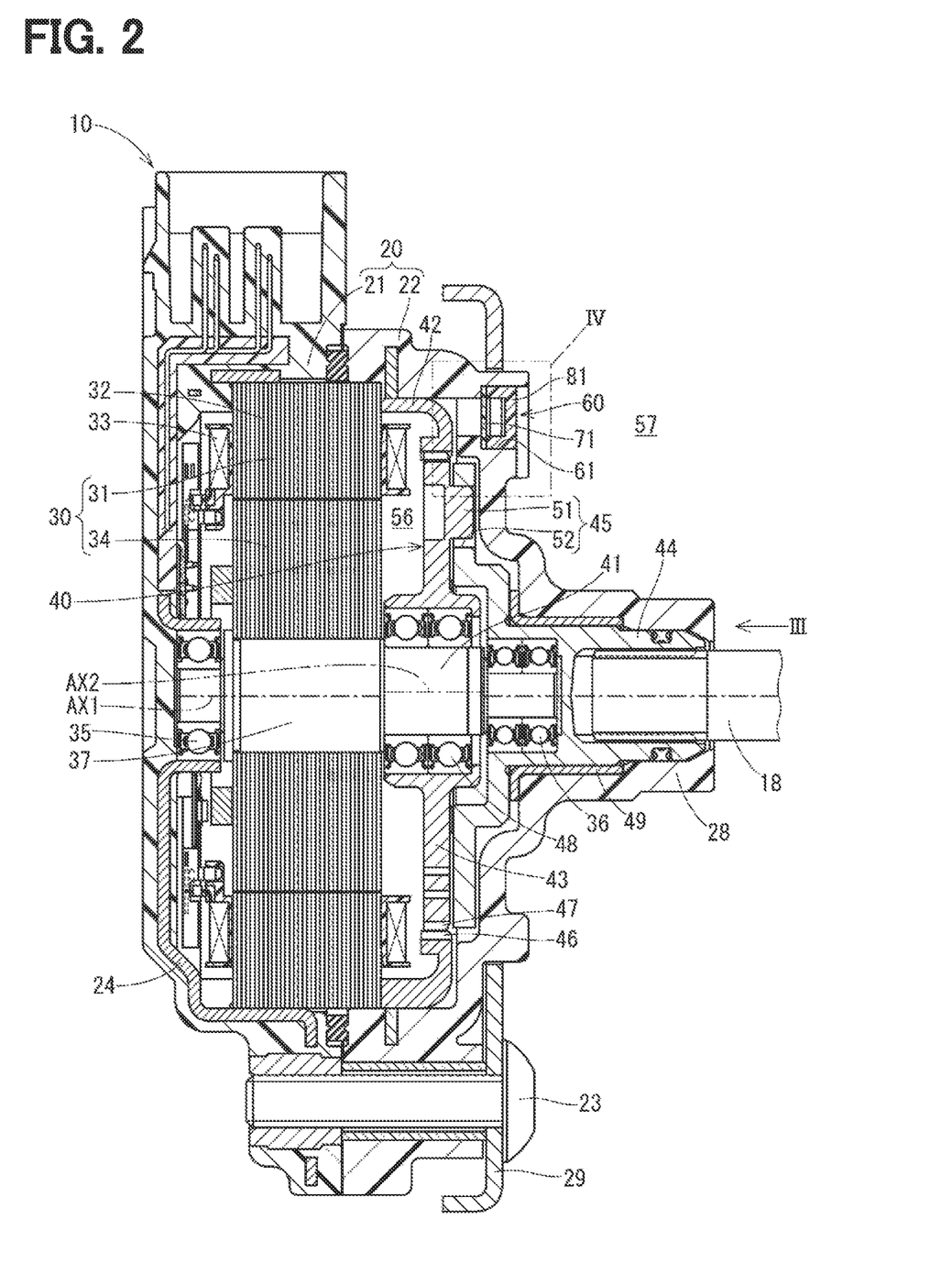
FIG. 2 is a cross-sectional view of the actuator of the first embodiment.

First of all, an overall structure of the actuator 10 will be described with reference to FIG. 2. The actuator 10 includes a housing 20, an electric motor 30 and a speed reducer 40.

The housing 20 includes a front housing 21, which is shaped in a cup form, and a rear housing 22. The front housing 21 and the rear housing 22 are joined together by bolts 23 in a state where an opening of the front housing 21 and an opening of the rear housing 22 are opposed to each other. A metal plate 24, which is shaped in a bottomed tubular form, is embedded in the front housing 21. The rear housing 22 has a tubular projection 28 which projects toward a side that is opposite to the front housing 21. A bracket 29 is fixed to an outer wall of the rear housing 22. The actuator 10 is installed to the case 12 (see FIG. 1) of the transmission 11 through the bracket 29.

The electric motor 30 includes a stator 31, a rotor 34 and a shaft 37. The stator 31 includes a stator core 32 and coils 33. The stator core 32 is shaped in a ring form and is fixed to the metal plate 24 by, for example, press-fitting. The coils 33 are wound around the stator core 32. The rotor 34 is rotatably installed on an inner side of the stator 31. The shaft 37 is supported by a motor side bearing 35 and a speed reducer side bearing 36 such that the shaft 37 is rotatable about a rotational axis AX1. The shaft 37 is rotated together with the rotor 34 and outputs a torque of the electric motor 30. The motor side bearing 35 is installed to the metal plate 24. The speed reducer side bearing 36 is installed to an output member 44 described later.

The speed reducer 40 includes an eccentric shaft 41, a ring gear 42, an eccentric gear 43, the output member 44 and a transmission mechanism 45. The eccentric shaft 41 is placed on an eccentric axis Ax2, which is eccentric to the rotational axis AX1, and the eccentric shaft 41 is formed integrally with the shaft 37 in one-piece. The ring gear 42 is coaxial with the rotational axis AX1 and is fixed to the rear housing 22. The eccentric gear 43 has external teeth 47, which are meshed with internal teeth 46 of the ring gear 42. The eccentric gear 43 is supported by a bearing 48 installed to the eccentric shaft 41 so as to make a planetary motion. The planetary motion is a motion that revolves around the rotational axis AX1 while rotating around the eccentric axis AX2. A rotational speed of the eccentric gear 43 at the time of planetary motion is reduced relative to a rotational speed of the shaft 37.

The output member 44 is placed coaxially with the rotational axis AX1 and is rotatably supported by a bearing 49 installed to the rear housing 22. The output member 44 is an output portion that outputs the torque of the electric motor 30 to a control shaft 18 which serves as a drive subject. The transmission mechanism 45 includes: an engaging projection 51, which is formed at the eccentric gear 43; and an engaging hole 52, which is formed at the output member 44 and receives the engaging projection 51. The transmission mechanism 45 transmits rotation of the eccentric gear 43 about the eccentric axis Ax2, to the output member 44.

In the actuator 10, a rotating magnetic field is generated by switching the energizing phase of the coils 33, and the rotor 34 is rotated when the rotor 34 receives a magnetic attraction force or a magnetic repulsion force generated by the rotating magnetic field. When the eccentric shaft 41 is rotated about the rotational axis AX1 together with the rotor 34, the eccentric gear 43 makes the planetary motion. Therefore, the rotation of the eccentric gear 43, a rotational speed of which is reduced relative to a rotational speed of the rotor 34, is outputted to the outside from the output member 44.

(Breather Structure)

Next, the breather structure of the actuator 10 will be described with reference to FIGS. 2 to 6. The housing 20 has a receiving space 56 which receives the electric motor 30 and the speed reducer 40. The receiving space 56 is formed by an internal space defined between the front housing 21 and the rear housing 22. The actuator 10 has the breather structure 60 that is configured to reduce a pressure difference between the space (hereinafter referred to as the receiving space) 56 in the housing 20 and a space (hereinafter referred to as an outside space) 57 at an outside of the housing 20.

Figure 4:
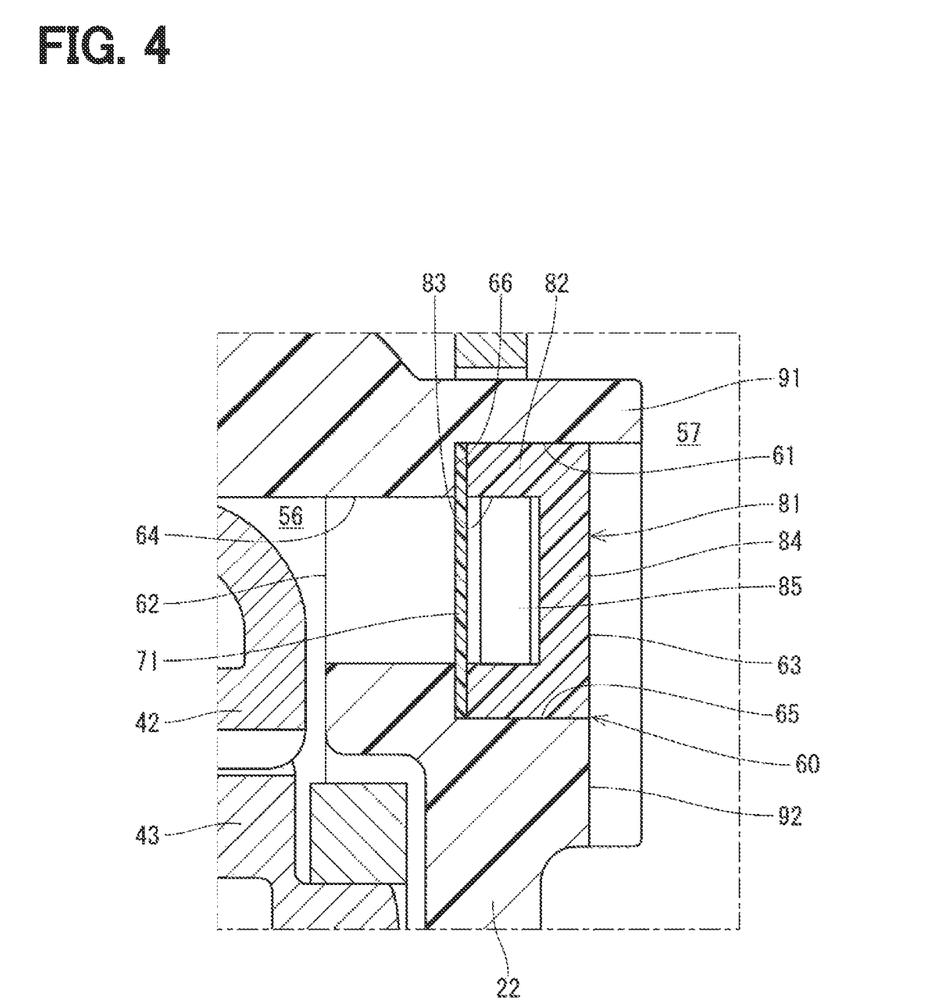
FIG. 4 is an enlarged view of a portion IV of FIG. 2, indicating a cross-section around the breather structure.

The breather structure 60 includes a breathing hole 61, a filter 71 and a blocker 81. The breathing hole 61 is a through-hole that extends through the housing 20 between the inside and the outside of the housing 20. The breathing hole 61 communicates between the receiving space 56 and the outside space 57. In the first embodiment, the breathing hole 61 is located at an upper portion of a bottom of the rear housing 22 in an installed state of the actuator 10 where the actuator 10 is installed to a vehicle, and the breathing hole 61 is communicated with an upper portion of the receiving space 56 positioned relatively upper side in the receiving space 56. The breathing hole 61 is shaped in a stepped form and has a small diameter portion 64 and a large diameter portion 65. The small diameter portion 64 has an opening (hereinafter referred to as an inner opening) 62 located on the receiving space 56 side, and the large diameter portion 65 has an opening (hereinafter referred to as an outer opening) 63 located on the outside space 57 side.

The filter 71 permits a flow of gas through the breathing hole 61 via the filter 71 while limiting a flow of liquid and a flow of solid through the breathing hole 61 between the inside and the outside of the housing 20. In the first embodiment, the filter 71 is a film that has a waterproof and breathable function, and the filter 71 is fixed to a stepped surface 66 (i.e., an end part of the large diameter portion 65 located on the small diameter portion 64 side) of the breathing hole 61.

The blocker 81 blocks a portion of a path which extends from the outer opening 63 of the breathing hole 61 to the filter 71, and thereby the blocker 81 limits arrival of the liquid and the solid from outside space 57 to the filter 71. In the first embodiment, the blocker 81 is formed separately from the housing 20 and is fixed to the large diameter portion 65. The filter 71 is located between the stepped surface 66 and the blocker 81.

Figure 5:
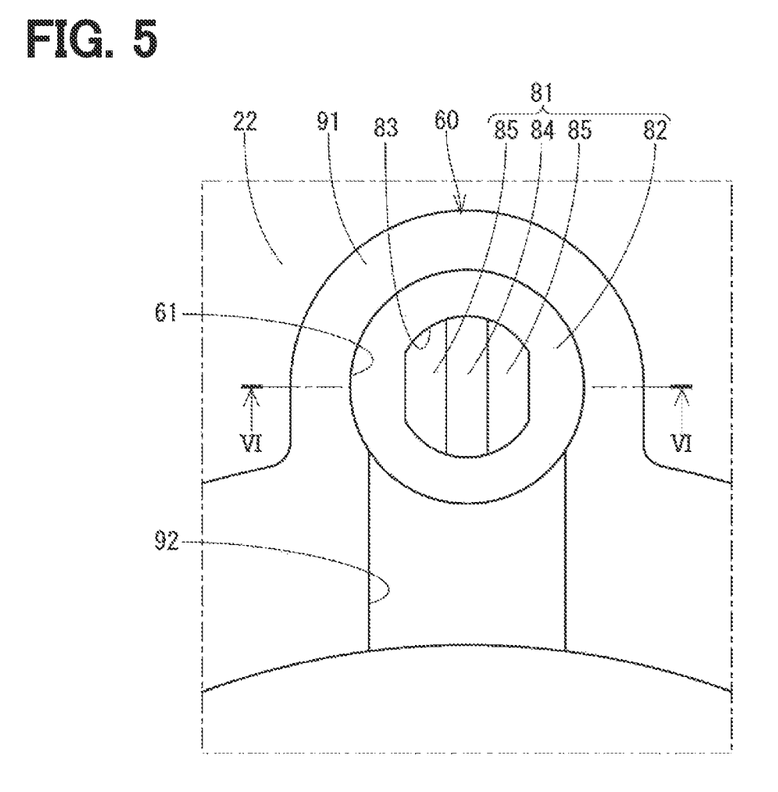
FIG. 5 is an enlarged view of a portion V of FIG. 3, indicating around the breather structure.
Figure 6:
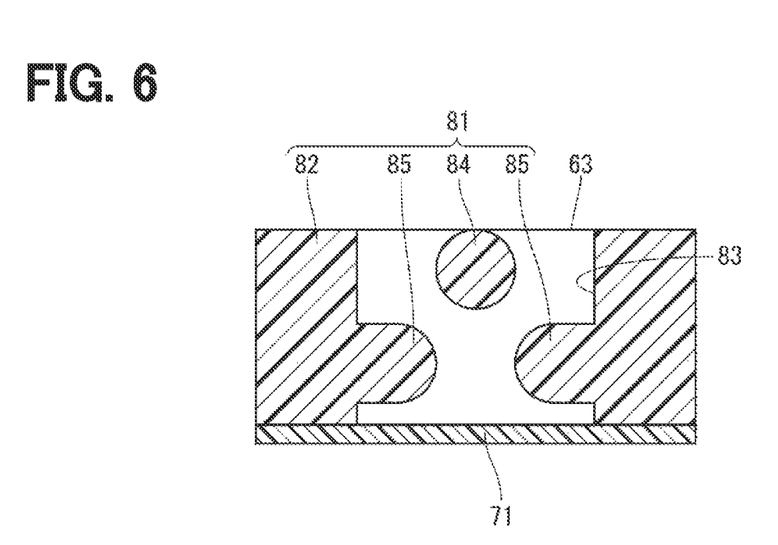
FIG. 6 is a cross-sectional view taken along line VI-VI in FIG. 5 indicating a filter and a blocker.

The blocker 81 includes a tubular portion 82, a primary blocking portion 84 and two secondary blocking portions 85. The tubular portion 82 is press-fitted to the large diameter portion 65. The primary blocking portion 84 and the secondary blocking portions 85 are formed at an inside of a through-hole 83 of the tubular portion 82. The primary blocking portion 84 and the secondary blocking portions 85 are protrusion-like obstacles arranged in a zigzag pattern (creating a meandering passage) when viewed in a direction that is substantially perpendicular to a penetrating direction of the through-hole 83.

The primary blocking portion 84 is located in the middle of the path extending from the outer opening 63 to the filter 71. In the first embodiment, the primary blocking portion 84 is located at a center of an end portion of the through-hole 83, which is adjacent to the outside space 57, and the primary blocking portion 84 extends from one location of an inner wall of the through-hole 83 to an opposite location of the inner wall, which is opposite to the one location in a direction generally perpendicular to the penetrating direction.

The secondary blocking portions 85 are located between the primary blocking portion 84 and the filter 71 and are arranged such that the secondary blocking portions 85 completely overlap with two openings, respectively, which are other than the primary blocking portion 84, when a side, at which the filter 71 is placed, is viewed from the outer opening 63. The two openings, which are other than the primary blocking portion 84, are two spaces defined by the inner wall of the through-hole 83 and the primary blocking portion 84 in the first embodiment. The secondary blocking portions 85 are located on two sides, respectively, of the primary blocking portion 84 when the side, at which the filter 71 is placed, is viewed from the outer opening 63. The primary blocking portion 84 and the secondary blocking portions 85 are arranged such that the filter 71 cannot be seen from the outer opening 63 due to the presence of the primary blocking portion 84 and the secondary blocking portions 85 which block the view.

Each of the primary blocking portion 84 and the secondary blocking portions 85 is formed to extend in the vertical direction (i.e., the direction of gravity) when the actuator 10 is installed on the vehicle. Also, each of the spaces, which are defined by the inner wall of the through-hole 83 and a corresponding one of the primary blocking portion 84 and the secondary blocking portions 85, is also formed to extend in the vertical direction when the actuator 10 is installed on the vehicle.

Figure 3:
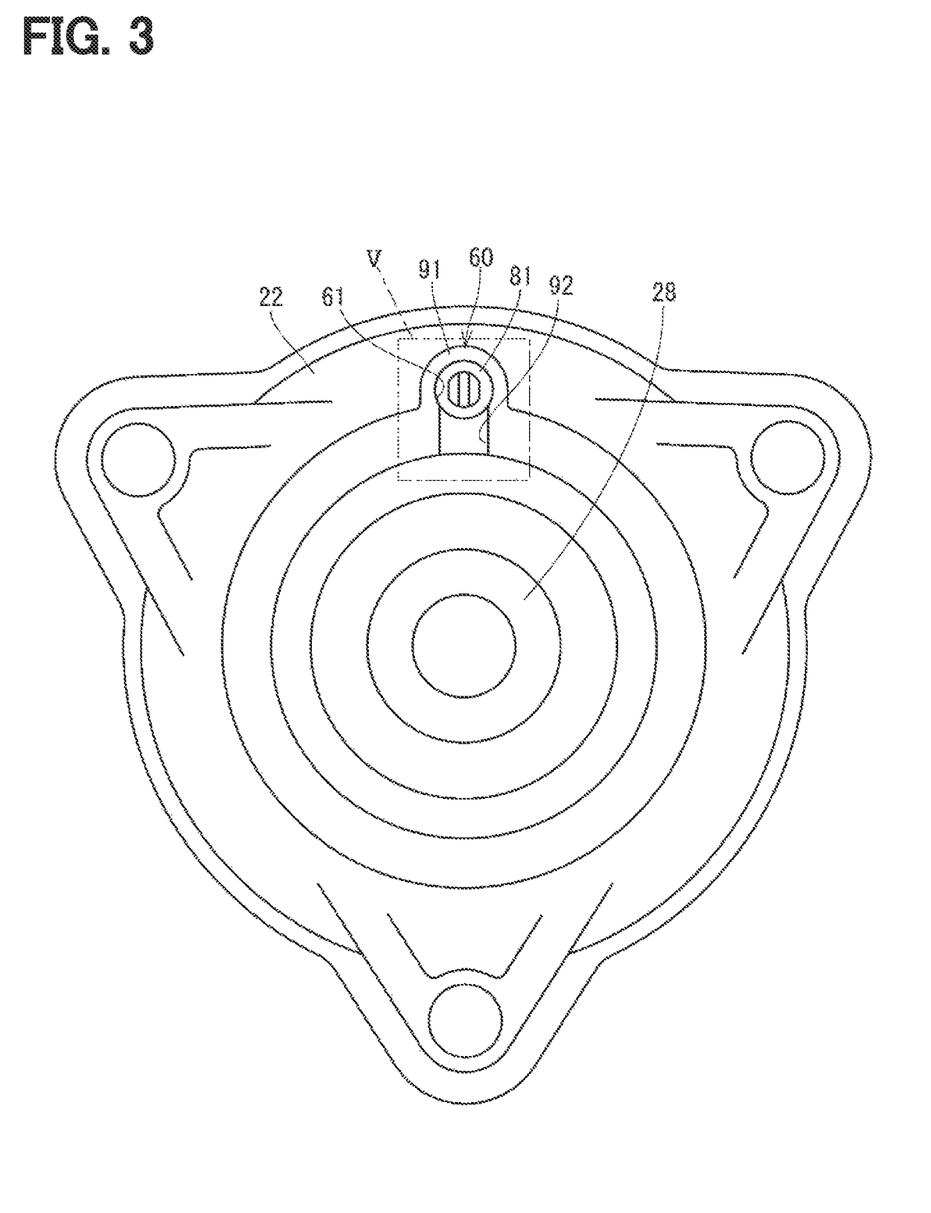
FIG. 3 is a view of a rear housing and a breather structure viewed in a direction of arrow III in FIG. 2.

The breather structure 60 further includes a wall portion 91 which is formed at the rear housing 22 such that the wall portion 91 projects from the outer opening 63 of the breathing hole 61 toward the outside space 57 and circumferentially extends around the outer opening 63. The wall portion 91 surrounds one half or more of the circumference (i.e., the circumferential extent) of the outer opening 63. Furthermore, the wall portion 91 has a cutout 92 at a lower side of the wall portion 91 which is placed on the lower side in the vertical direction when the actuator 10 is installed on the vehicle. The cutout 92 is a recessed groove that extends from the breathing hole 61 toward the lower side in the vertical direction.

(Advantages)

As described above, in the first embodiment, the breather structure 60 includes: a breathing hole 61 that extends through the housing 20 between an inside and an outside of the housing 20; a filter 71 that is configured to permit a flow of gas through the breathing hole 61 via the filter 71 while limiting a flow of liquid and a flow of solid through the breathing hole 61 between the inside and the outside of the housing 20; and the blocker 81. The blocker 81 is configured to block a portion of a path extending from an outer opening 63, which is an opening of the breathing hole 61 opened to an outside space 57, to the filter 71 to limit arrival of the liquid and the solid from the outside space 57 to the filter 71. With this breather structure 60, it is possible to avoid the projection of the filter 71 at the outside of the housing 20, so that the installability of the actuator 10 is improved. Furthermore, when the high-pressure liquid tries to flow into the breathing hole 61, the blocker 81 weakens the pressure of the liquid, so that the filter 71 can be protected.

Furthermore, according to the first embodiment, the blocker 81 includes: at least one primary blocking portion 84, which is placed in a middle of the path extending from the outer opening 63 to the filter 71; and at least one secondary blocking portion 85, which is placed between the at least one primary blocking portion 84 and the filter 71. The at least one secondary blocking portion 85 completely overlaps with at least one opening, which is other than the at least one primary blocking portion 84, when a side, at which the filter 71 is placed, is viewed from the outer opening 63. As a result, the at least one primary blocking portion 84 and the at least one secondary blocking portion 85 are arranged such that the filter 71 cannot be seen from the outer opening 63. Therefore, it is possible to limit the liquid from the outside space 57 from directly colliding the filter 71.

Furthermore, according to the first embodiment, the blocker 81 is configured to extend in a vertical direction in an installed state of the actuator 10 where the actuator 10 is installed on an installation destination (specifically, the vehicle in the first embodiment). This makes it easier for the liquid, which has entered the breathing hole 61, to go out, and it is possible to limit the liquid from accumulating in the breathing hole 61.

Furthermore, in the first embodiment, the blocker 81 is formed separately from the housing 20. Therefore, the orientation of the blocker 81 can be adjusted according to the orientation of the installed actuator 10.

Furthermore, according to the first embodiment, the breather structure 60 further includes a wall portion 91 that projects on a side of the outer opening 63 where the outside space 57 is located. The wall portion 91 is formed at the rear housing 22 such that the wall portion 91 extends along a circumference of the outer opening 63. Therefore, the wall portion 91 serves as a barrier, and thereby the inflow of liquid into the breathing hole 61 can be limited.

Furthermore, according to the first embodiment, the wall portion 91 surrounds one half or more of the circumference of the outer opening 63. Therefore, the inflow of liquid into the breathing hole 61 can be further limited.

Furthermore, according to the first embodiment, the wall portion 91 has a cutout 92 at a lower side of the wall portion 91 in the vertical direction in the installed state of the actuator 10. Therefore, the inflow of liquid from the upper side of the breathing hole 61 into the breathing hole 61 can be limited. Furthermore, even when the liquid flows into the breathing hole 61, the liquid can flow out toward the ground along the cutout 92.

Second Embodiment

Figure 7:
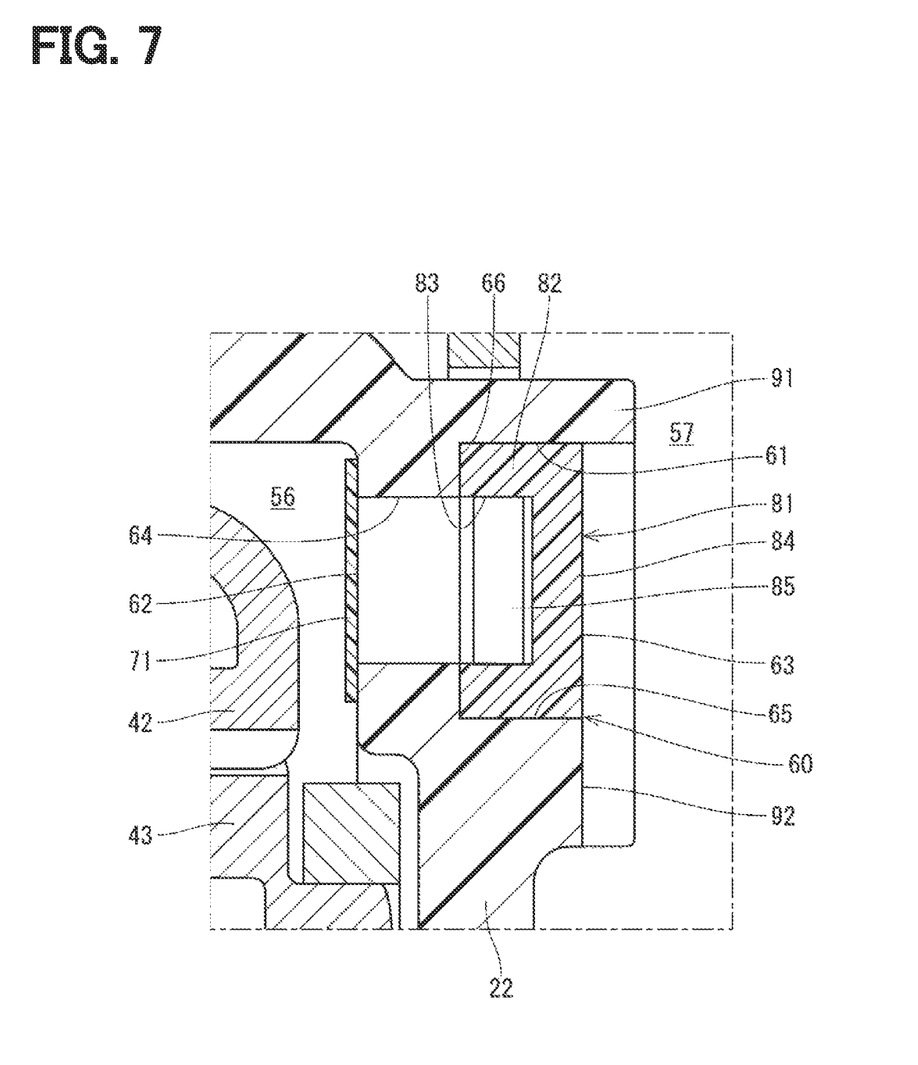
FIG. 7 is a cross-sectional view showing a breather structure of a second embodiment, corresponding to FIG. 4 of the first embodiment.

In a second embodiment, as shown in FIG. 7, the filter 71 is fixed to an inner wall surface of the rear housing 22 such that the filter 71 closes the inner opening 62. Specifically, the filter 71 is installed to a periphery of the inner opening 62. Although there is a difference in the arrangement of the filter 71 as described above, the advantages, which are similar to those of the first embodiment, can be obtained according to the second embodiment.

Third Embodiment

Figure 8:
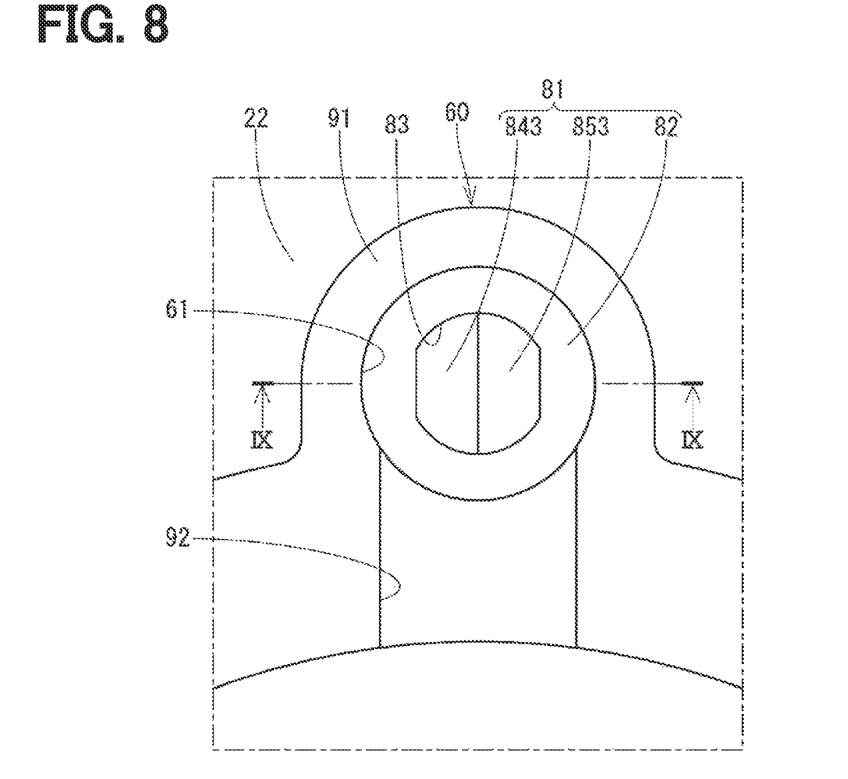
FIG. 8 is a cross-sectional view showing around a breather structure of a third embodiment, corresponding to FIG. 5 of the first embodiment.
Figure 9:
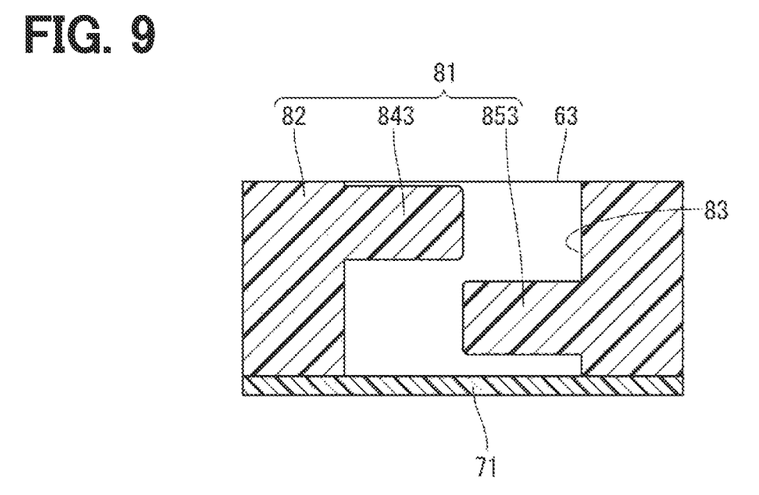
FIG. 9 is a cross-sectional view taken along line IX-IX in FIG. 8 indicating a filter and a blocker.

In a third embodiment, as shown in FIGS. 8 and 9, the single primary blocking portion (i.e., only one primary blocking portion) 843 and the single secondary blocking portion (i.e., only one secondary blocking portion) 853 are provided. The primary blocking portion 843 is arranged such that the primary blocking portion 843 closes one side (one half) of the through-hole 83 located on one side in a direction substantially perpendicular to the penetrating direction of the through-hole 83. The secondary blocking portion 853 is arranged such that the secondary blocking portion 853 closes the other side (other one half) of the through-hole 83 located on the other side in the direction substantially perpendicular to the penetrating direction of the through-hole 83. Although there are differences in the shapes and arrangements of the primary blocking portion 843 and the secondary blocking portion 853, the primary blocking portion 843 and the secondary blocking portion 853 are arranged such that the filter 71 cannot be seen from the outer opening 63. Therefore, the advantages, which are similar to those of the first embodiment, can be achieved according to the third embodiment.

Fourth Embodiment

Figure 10:
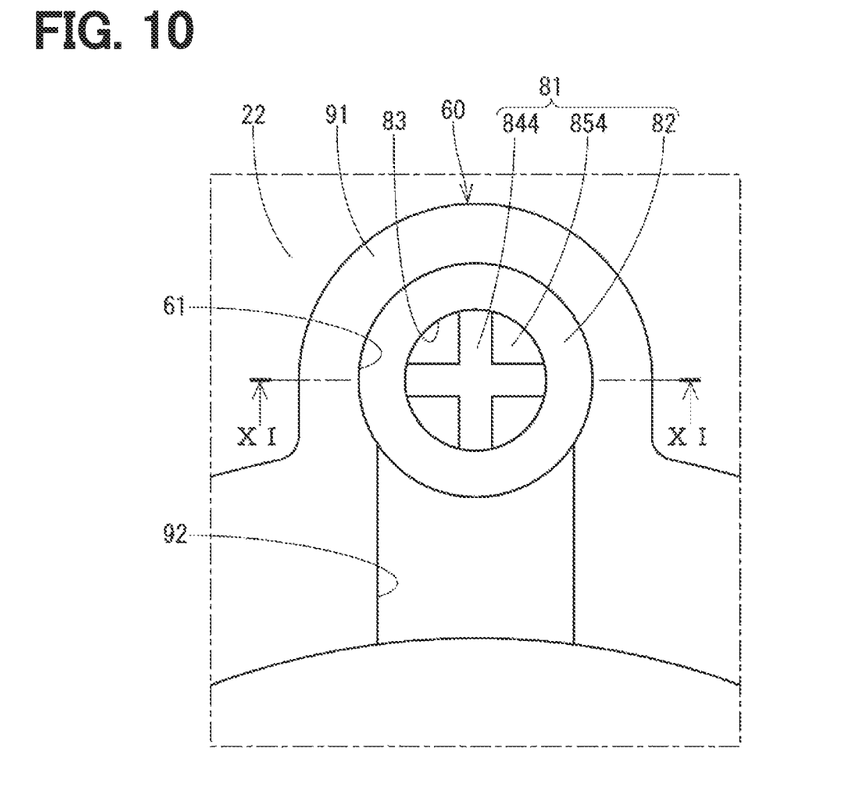
FIG. 10 is a cross-sectional view showing around a breather structure of a fourth embodiment, corresponding to FIG. 5 of the first embodiment.
Figure 11:
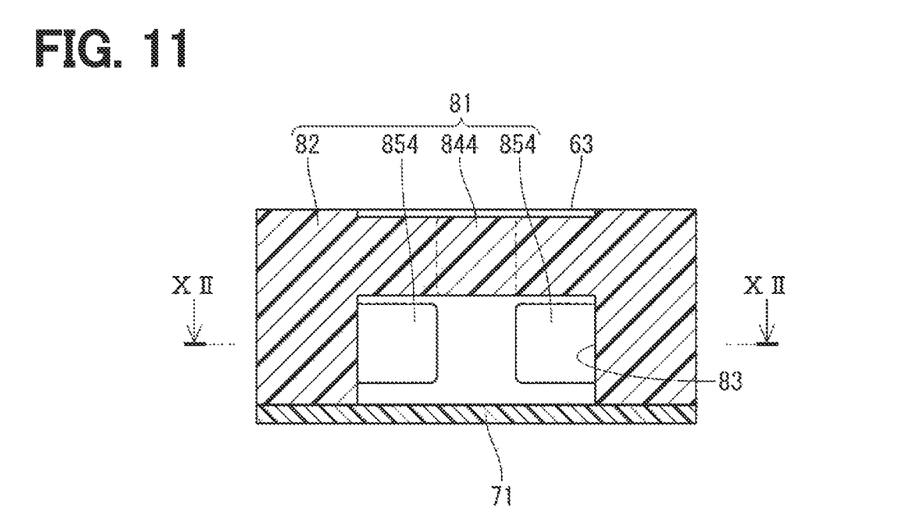
FIG. 11 is a cross-sectional view taken along line XI-XI in FIG. 10 indicating a filter and a blocker.
Figure 12:
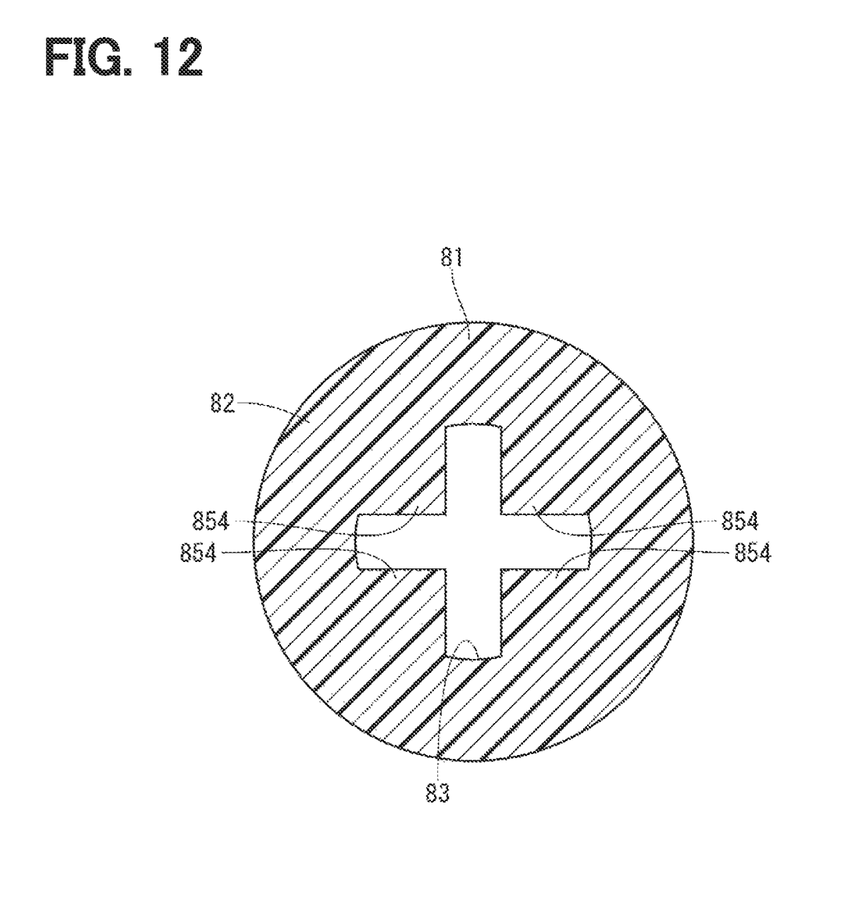
FIG. 12 is a cross-sectional view taken along the line XII-XII in FIG. 11 indicating the blocker.

In a fourth embodiment, as shown in FIGS. 10 to 12, the primary blocking portion 844 has a criss-cross shape and is formed to outwardly extend from a center of the through-hole 83 in four directions. The secondary blocking portions 854 are formed as four projections such that the secondary blocking portions 854 project from the inner wall of the through-hole 83 toward the center of the through-hole 83 and define an opening shaped in a criss-cross shape, which overlaps with the primary blocking portion 844, between the secondary blocking portions 854 and the inner wall of the through-hole 83 when viewed from the outer opening 63 side. Although there are differences in the shapes and arrangements of the primary blocking portion 844 and the secondary blocking portions 854, the primary blocking portion 844 and the secondary blocking portions 854 are arranged such that the filter 71 cannot be seen from the outer opening 63. Therefore, the advantages, which are similar to those of the first embodiment, can be achieved according to the fourth embodiment.

Fifth Embodiment

Figure 13:
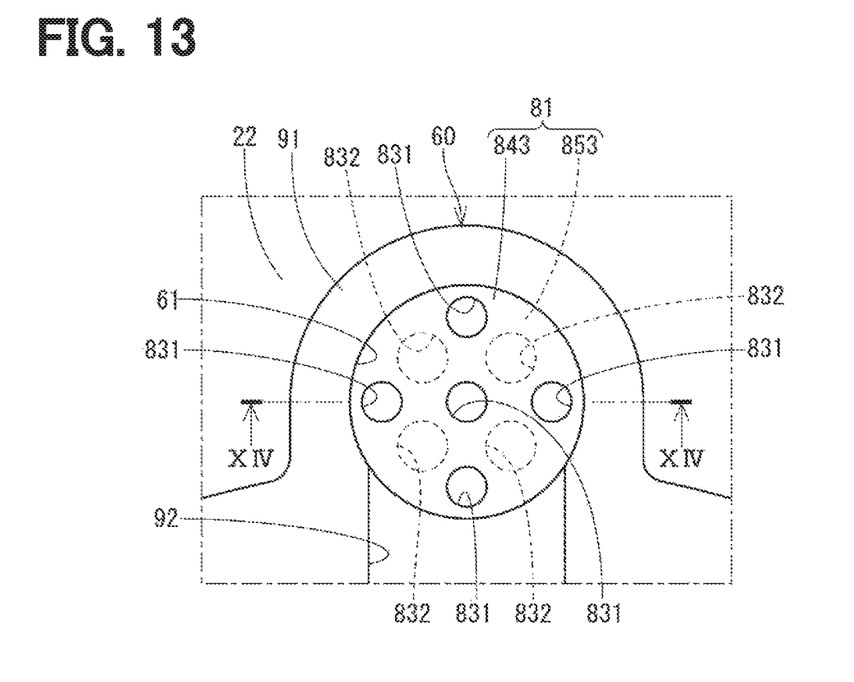
FIG. 13 is a diagram showing around a breather structure of a fifth embodiment, corresponding to FIG. 5 of the first embodiment.
Figure 14:
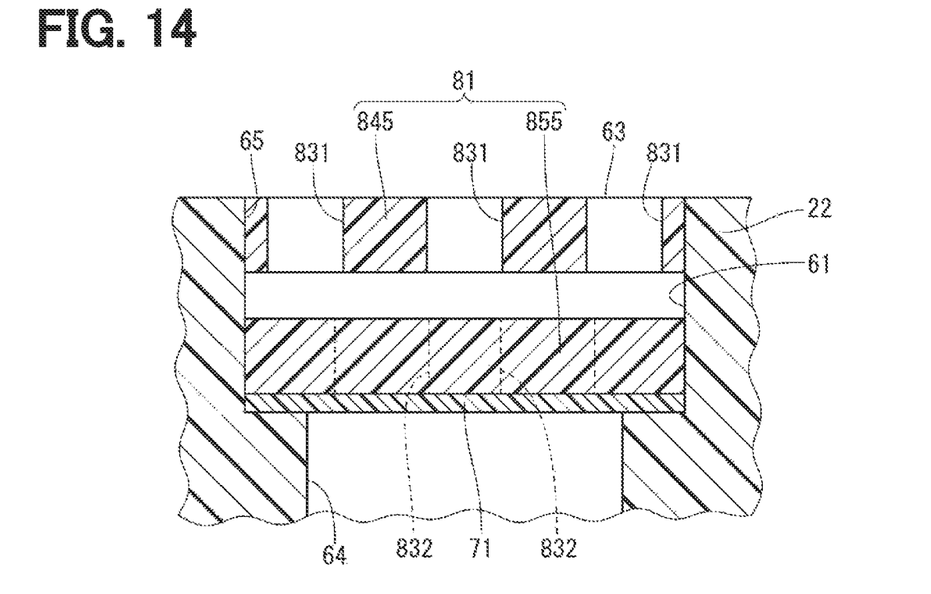
FIG. 14 is a cross-sectional view taken along line XIV-XIV in FIG. 13 indicating a filter and a blocker.

In a fifth embodiment, as shown in FIGS. 13 and 14, the primary blocking portion 845 and the secondary blocking portion 855 are formed as two separate members, respectively. The primary blocking portion 845 has a plurality of primary through-holes 831. The secondary blocking portion 855 has a plurality of secondary through-holes 832 that are respectively placed at a plurality of positions that are different from positions of the primary through-holes 831 when the filter 71 side is viewed from the outer opening 63. Although there are differences in the shapes and arrangements of the primary blocking portion 845 and the secondary blocking portion 855, the primary blocking portion 845 and the secondary blocking portion 855 are arranged such that the filter 71 cannot be seen from the outer opening 63. Therefore, the advantages, which are similar to those of the first embodiment, can be achieved according to the fifth embodiment. Furthermore, by forming the primary blocking portion 845 and the secondary blocking portion 855 as the separate members, respectively, it is possible to manufacture the blocker 81 even when the blocker 81 has a complicated shape.

Other Embodiments

In another embodiment, the breathing hole may be provided anywhere in the housing as long as the breathing hole extends through the housing between the inside and the outside of the housing. The breathing hole may not be shaped in a stepped form. There may be provided a plurality of breathing holes.

Figure 15:
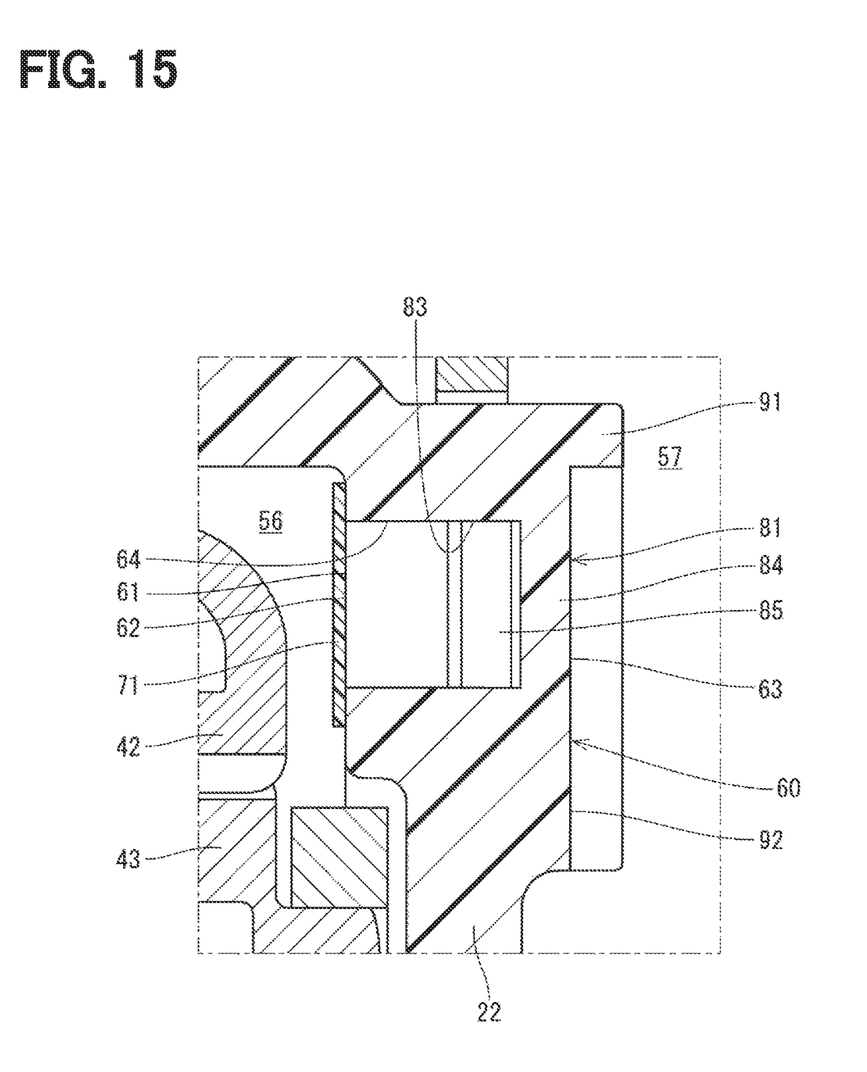
FIG. 15 is a cross-sectional view showing a breather structure of a modification, showing a cross-section corresponding to FIG. 7.

In another embodiment, the blocker may be formed integrally with the housing in one-piece. Specifically, the blocker and the housing may be formed together by a common member. For instance, as shown in FIG. 15, which is a modification of FIG. 7, the blocker 81 and the rear housing 22 are formed integrally in one-piece by the common member. In other words, the blocker 81 is integrated into the rear housing 22 in one-piece in FIG. 15.

Furthermore, the blocker may be made of three or more members. The blocker may not be necessarily configured such that the filter cannot be seen from the outer opening. As long as the blocker is configured to block the portion of the path from the outer opening to the filter, the filter can be protected.

The present disclosure is not limited to the above-described embodiments and can be implemented in various forms without departing from the spirit of the present disclosure.

The present disclosure has been described with reference to the embodiments. However, the present disclosure is not limited to the above embodiments and the structures described therein. The present disclosure also includes various variations and variations within the equivalent range. Also, various combinations and forms, as well as other combinations and forms that include only one element, more, or less, are within the scope and ideology of the present disclosure.

What is claimed is:

1. A breather structure configured to be provided to a housing of an actuator that is used as a drive device of a shift-by-wire system of a vehicle, the breather structure comprising:
  a breathing hole that extends through the housing between an inside and an outside of the housing;
  a filter that is configured to permit a flow of gas through the breathing hole via the filter while limiting a flow of liquid and a flow of solid through the breathing hole between the inside and the outside of the housing; and
  a blocker that is configured to block a portion of a path extending from an outer opening, which is an opening of the breathing hole opened to an outside space, to the filter to limit arrival of the liquid and the solid from the outside space to the filter, wherein the blocker and the housing are formed integrally in one-piece, and the blocker includes:

at least one primary blocking portion, which is placed in the path extending from the outer opening to the filter; and at least one secondary blocking portion, which is placed between the at least one primary blocking portion and the filter, wherein the at least one secondary blocking portion completely overlaps with at least one opening, which is other than the at least one primary blocking portion, when a side, at which the filter is placed, is viewed from the outer opening.

2. The breather structure according to claim 1, wherein the blocker is configured to extend in a vertical direction in an installed state of the actuator.

3. The breather structure according to claim 1, further comprising a wall portion that projects on a side of the outer opening where the outside space is located, wherein the wall portion is formed at the housing such that the wall portion extends along a circumference of the outer opening.

4. The breather structure according to claim 3, wherein the wall portion surrounds one half or more of the circumference of the outer opening.

5. The breather structure according to claim 4, wherein the wall portion has a cutout at a lower side of the wall portion in a vertical direction in an installed state of the actuator.

* * * * *